July 31, 1945.  L. L. BELTZ  2,380,717

APPARATUS FOR CONTROLLING TRANSMISSION MECHANISM

Filed Jan. 17, 1942  2 Sheets-Sheet 1

INVENTOR.
Lester L. Beltz
BY
Tibbetts + Hart
Attorneys

July 31, 1945.    L. L. BELTZ    2,380,717
APPARATUS FOR CONTROLLING TRANSMISSION MECHANISM
Filed Jan. 17, 1942    2 Sheets-Sheet 2

INVENTOR.
Lester L. Beltz
BY
Attorneys

Patented July 31, 1945

2,380,717

UNITED STATES PATENT OFFICE 2,380,717

APPARATUS FOR CONTROLLING TRANSMISSION MECHANISM

Lester L. Beltz, Detroit, Mich., assignor to Packard Motor Car Company, Detroit, Mich., a corporation of Michigan Application January 17, 1942, Serial No. 427,096

12 Claims. (Cl. 74—472)

This invention relates to transmissions and more particularly to apparatus for controlling transmission drive modification.

Some transmissions, such as the type illustrated in Patent No. 2,366,254, issued January 2, 1945, to Clyde R. Paton, are equipped with mechanism arranged between a driving shaft and a driven shaft for establishing direct drive or a modified drive, such as an overdrive. Such mechanism consists of planetary gearing for modifying the drive and a one-way overrunning clutch for automatically establishing direct drive when the planetary gearing is made ineffective.

The planetary gearing is made effective by braking or holding the sun gear and a pawl is slidably mounted in an opening in the transmission casing to hold or release the sun gear. A spring urges the pawl in one direction and a solenoid acts to urge the pawl in the opposite direction, usually into sun gear holding direction. The solenoid is connected in an electric circuit controlled by a governor and manually operable mechanism, such as the throttle control mechanism for a motor vehicle engine. The arrangement is usually such that the governor acts to energize the solenoid when the vehicle speed is above some predetermined value to thereby engage the pawl with the sun gear, and the throttle mechanism is operable, when moved beyond wide open throttle position, to open the circuit above a predetermined vehicle speed and thereby allow spring release of the pawl from the sun gear so that direct drive is automatically established through the one-way clutch.

Torque causes the sun gear to exert pressure against the pawl, when engaged therewith, that tends to hold the engagement against the action of the return spring even though the solenoid has been deenergized, and means for temporarily interrupting the engine ignition is arranged to obtain torque reversal in the planetary gearing so that the spring can act to release the pawl. When the solenoid is energized by the governor action, the planetary is rotating so that the pawl ratchets on the sun gear, but this condition is prevented by a torque actuated blocker that is effective to prevent engagement of the pawl with the sun gear until there is torque reversal in the planetary gearing. This torque reversal has been obtained by reducing the throttle valve opening causing deceleration of the engine.

Deceleration of the motor by reducing the throttle valve opening to cause torque reversal shifting of the blocker requires time, which, under some driving conditions, is not too plentiful. Such deceleration also requires the driver to lift his foot engaging the accelerator pedal, which operation is undesirable. In order to obtain such torque reversal, in control apparatus of the type referred to, quickly and without physical effort, this invention proposes to temporarily interrupt engine ignition at the time the solenoid is energized through operation of the solenoid circuit control mechanism.

Another object of the invention is to provide control mechanism for a transmission of the type referred to in which the solenoid control circuit is connected with the engine ignition circuit in a manner to cause momentary ignition interruption whenever the solenoid circuit is completed or broken by the control mechanism.

Another object of the invention is to provide means for interrupting engine ignition in a transmission control of the type referred to that becomes effective only upon predetermined engine operating conditions.

Other objects of the invention will appear from the following description taken in connection with the drawings, which form a part of this specification, in which.

Figures 1, 2:
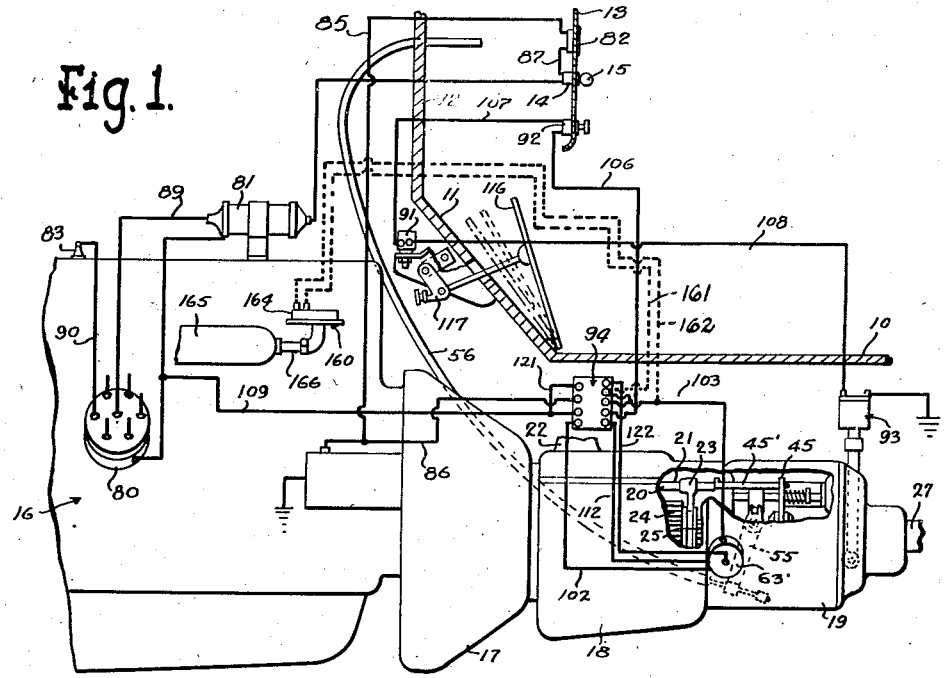
Fig. 1 is a diagrammatic elevational view of a motor vehicle power and transmission unit with control mechanism incorporating the invention associated therewith.
Fig. 2 is a diagrammatic view of the engine ignition and transmission control circuits.
Figure 3:
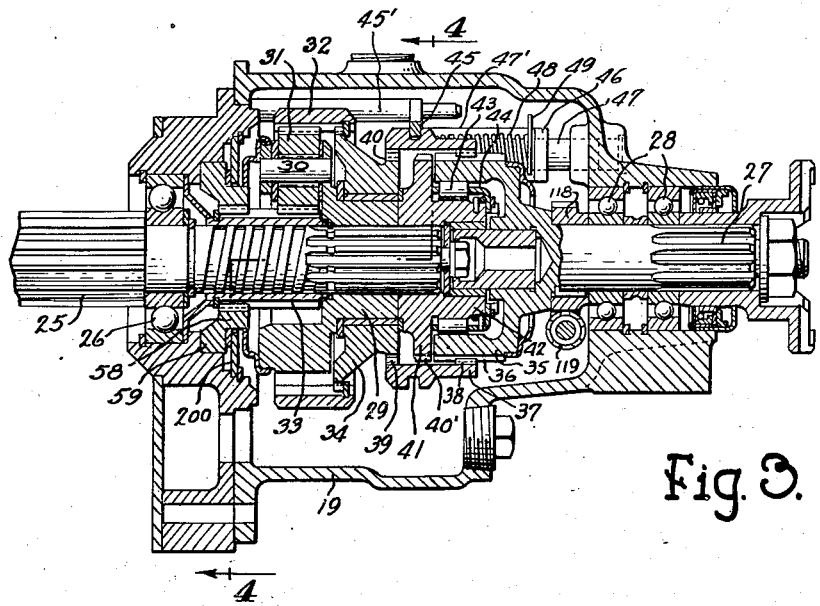
Fig. 3 is a vertical sectional view of the drive modifying portion of the transmission.

Referring to the drawings by characters of reference, 10 represents the floor board of a motor vehicle body having at the front end thereof a toe board 11 that terminates at its forward end in a dash 12. The instrument panel 13 carries a conventional ignition switch 14 controlled by a key 15.

The power transmitting unit includes engine 16, main clutch containing casing 17 at the rear of the engine, change speed gearing casing 18 at the rear of the clutch casing, and casing 19 at the rear of the transmission mechanism casing containing drive modifying mechanism. The change speed gearing in casing 18 is conventional and is controlled by a pair of shift rods 20 and 21 actuated by conventional mechanism under the control of a manually operable shift lever (not shown) extending from the tower 22 on top of the casing 18. The shift rod 21 carries a yoke 23 that engages with and shifts a gear clutch element 24 for selectively establishing either first or reverse drive, the clutch element in its rearmost position meshing with the conventional reverse idler (not shown).

The driven shaft 25 at the rear end of the change speed gearing projects through the front wall of the casing 19 and is suitably supported therein by ball bearing 26. In axial alignment with shift 25 is a tail shaft 27 that projects through the rear wall of casing 19 and is suitably supported therein by ball bearings 28. These shafts 25 and 27 are connected in driving relation by mechanism that can be controlled to selectively provide a direct drive, a modified drive which in this instance is overdrive, or a direct drive through an overrunning clutch. Associated with the shaft 25 is planetary gearing consisting of a cage 29, having a rearwardly extending sleeve portion splined to shaft 25, carrying journals 30 on which planet gears 31 are rotatably mounted. The planet gears mesh with internal teeth of a planetary ring gear 32 and they also mesh with the external teeth of a sun gear 33 rotatably mounted on the shaft 25. Rotatably mounted on the sleeve portion of cage 29 and fixed to rotate with the ring gear 32 by means of splines is a clutch element 34. The ring 32 and the clutch element 34 can be formed as one piece if desired.

The forward flanged end 35 of the tail shaft 27 is enlarged and has peripheral clutch teeth 36. An axially shiftable clutch sleeve 37 telescopes the forward portion of the enlarged shaft end 35 and has internal teeth 38 that are in constant meshing driving relation with the teeth 36. At the forward end of this shiftable clutch sleeve are provided internal teeth 39 that can be moved into or out of driving engagement with teeth 40 formed on the rear end of the clutch element 34. A driving member 41 is splined to the rear of the shaft 25 between the tail shaft and the planetary cage 29. This driving member has teeth 40' similar to and arranged to align with the clutch teeth 36 so that they can be engaged by the teeth 39 of the clutch sleeve 37 when shifted to rearmost position. This driving member is formed with a rearwardly extending hub 42 provided with peripheral cam surfaces, and between such cam surfaces and the interior wall of the enlarged end of the tail shaft is arranged a plurality of clutch rollers 43 carried by cage 44 adapted to provide an overrunning clutch connection between the member 41 and the tail shaft end 35.

The clutch sleeve 37 is shiftable manually to provide a positive driving connection from either the clutch element 34 of the planetary gearing or the driving member 41 to tail shaft 27. To control the position of this clutch sleeve it is engaged by a yoke 45 forming one end of a U-shaped device that includes a ring 46, slidably mounted upon a shaft 47 that is mounted for limited axial movement in casing 19, and a connecting strap 47'. Coil spring 48 extends around shaft 47 and is anchored at its rear end to such shaft by a spring clip 49, and its front end bears against the yoke 45. Fixed on the shaft 47 in advance of the yoke is an actuator member 50 having a pair of spaced fingers 51 depending therefrom between which a cam element 52 extends. This cam element is carried by an arm 53 fixed upon the end of a shaft 54 projecting through and carried by the side wall of casing 19. Fixed to the outer end of this shaft 54 is a lever 55 and connected to the lever 55 is a Bowden wire 56 that extends to the instrument panel and terminates in a control knob (not shown).

By pulling the knob outwardly from the dash, the lever 55 is moved forwardly and rocks the shaft 54 to operate the cam 53 so that the actuator 50 fixed to the shaft 47 is moved rearwardly and as the yoke 45 lies thereagainst it is also moved rearwardly thus moving the clutch sleeve 37 rearwardly so that the teeth 39 will engage the clutch 40' of drive element 41. A direct drive can thus be provided from shaft 25 to shaft 27. This same result can be accomplished when the change speed gear mechanism is associated in a reverse drive relation as shown in Fig. 1. In order to obtain reverse drive, the rail 21 is moved rearwardly and it actuates rod 45' with a shouldered extension that pushes the yoke 45 therewith on shaft 47 so that the clutch teeth 39 will be caused to mesh with the teeth 40' on drive element 41. Except when manually shifted in the two ways just described, the clutch sleeve is engaged with the planetary ring gear clutch 34 by spring 48.

The planetary gearing is controlled by means of a device associated to lock or release the sun gear. In the present instance an extension collar 58 is splined to the forward end of the sun gear and such extension is provided with a flange 59 having a plurality of radially extending recesses 60 adapted to receive a brake in the form of a pawl 61 slidably mounted in an opening 60' in the forward wall of casing 19. The pawl is normally disengaged from the sun gear collar thereby allowing the planetary gearing to idle so that a direct drive is established between the shafts 25 and 27 through the overrunning clutch rollers 43. When the pawl engages the sun gear collar, the sun gear will be held stationary and the planet gear carrier being driven by shaft 25 will cause the planet gears to rotate around the sun gear so that they will rotate the ring gear 32 at a faster speed than shaft 25. Thus the speed of the drive from the change speed gearing to the tail shaft can be direct through the overrunning clutch or stepped up while the clutch 37 is engaged with the clutch element 34. When the clutch member 37 is disengaged from the drive element 41 and the pawl is released then the drive will be from the shaft 25 to the drive member 41 and through the overrunning clutch rollers 43 to the tail shaft 27.

The pawl 61 that locks or releases the sun gear to establish overdrive or direct drive is actuated by a rod 62 under the control of an electromagnetic system including a solenoid 63. The solenoid is provided with a housing 64 secured to the side of casing 19 by bolts 65 and fixed in the housing is a pair of rods 66 to the outer ends of which is fixed a cross member 67. Centrally of the casing is fixed a bracket 68. Slidably mounted in the fixed bracket 68 is an armature 69 having a flanged cap portion 70 that covers a hollow end thereof. The rod 62 extends axially through the armature and is slidably associated therewith. On the end of the rod is a grounded contact 125. Within the hollow portion of the armature is a coil spring 72 that bears at one end against the cap and at the other end against a retainer 73 fixed to the pawl rod. Between the armature cap and the fixed bracket 68 is another coil spring 74 normally exerting sufficient pressure to hold the armature in extended position when the winding coils 75 and 76 of the solenoid are deenergized. The spring 72 is compressed by the armature movement, when the coils are energized, to create a sufficient force against the retainer 73, fixed to the pawl rod 62, to press the pawl into one of the recesses 60 in the sun gear collar upon a torque reversal of the sun gear.

The spring 72 when compressed by the armature is charged to move the pawl into a recess 60 in the sun gear collar, but if allowed to do so while the collar is rotating breakage would occur so means is provided to block out the pawl. Frictionally associated with the sun gear collar 59 is a blocking ring 200 having two spaced ears 201 extending radially therefrom. In the ring, and between the ears, is an opening 202 through which the pawl 61 must pass to enter one of the sun gear collar recesses. Rotation of the blocking ring is limited by a pair of plates 203 suitably anchored in casing 19 and arranged to serve as guides for the pawl. These plates project radially into the space between the ears 201 and thus limit rotation of the ring. The blocking ring travels with the sun gear collar, depending upon the direction of its rotation, until one of the ears 201 strikes against one of the guides where the ring is held and while in such position, the pawl when urged toward the sun gear will bear against the ring and is blocked from entering a sun gear collar recess. Upon reversal of torque in the planetary gearing, the blocking ring will travel in the reverse direction slowly so that the pawl can pass through slot 202 and into a recess in the ring gear collar.

Solenoid coil 76 is arranged to have sufficient capacity to overcome spring 74 and move the armature 69 toward the pawl 61 when energized, and solenoid coil 75 is designed to have sufficient capacity to hold the armature in the extended position into which it is shifted by coil 76. Coil 76 is connected to a contact 77 mounted on a spring arm that lies in the path of movement of the armature cap and normally engages grounded contact 78. Thus when the armature is energized, the movement of the cap will carry the switch arm 77 therewith to disengage the same from contact 78 and thus break the circuit of the primary coil 76. The coil 75 is grounded as indicated at 79 and it will hold the pawl in the position it has been moved to by the coil 76 after the circuit to coil 76 is broken. This movement of the armature does not shift the pawl rod 62 but compresses spring 72 so that the spring will push the pawl rod to engage the pawl with the sun gear collar when a torque reversal shifts the blocking ring. When the armature is released by the holding coil spring 74 will return it to normal position and this movement of the armature will move the retainer 73 therewith thus moving the pawl rod and the pawl to disengaged position and allowing switch 77 to move back into engagement with contact 78. Before the pawl can be disengaged from the sun gear collar a torque reversal is required and this is accomplished by interrupting engine ignition.

The engine ignition system consists of the usual elements including spark plugs as indicated at 83, a distributor 80, a coil 81, an ammeter 82, a battery 84, and the switch 14. A conductor 85 is connected with the battery and with a conductor 86 connected at one end with the ammeter. Between the ammeter and the ignition switch 14 is a conductor 87. Between the coil and the ignition switch is a conductor 88, and between the coil and the distributor is a high tension conductor 89. The distributor is connected to the spark plugs 83 by conductors 90.

It will be seen that the spark plugs can function only when the ignition switch is closed.

A plurality of controls for the electric system is provided. One of these controls is a foot operated kick switch structure indicated generally at 91, another control is a hand operated switch structure at the dash indicated generally at 92, and another of the controls is a governor operated switch structure indicated generally at 93, such controls being in series and regulating the action of the solenoid and the ignition.

In the electric control system for the ignition and the pawl solenoid there is arranged a relay 94 having three coils 95, 96 and 97 controlling switches. Coil 96 controls relay switch 98, coil 95 controls relay switches 99 and 100 and grounded coil 97 controls relay switch 101. Coil 96 is connected with solenoid coil 75 by conductor 102 and with coil 76 by conductors 103 and 104. Conductor 103 also leads to switch 100 which is connected with the power line 86. Conductor 105 leads from the power line to coil 95.

Switches 91, 92 and 93 are in series and switch 92 is connected with the relay coil 95 by conductor 106. Conductor 107 connects switch 92 with switch 91 and conductor 108 connects switch 91 with grounded switch 93. The distributer 80 is connected with relay switch 99 by conductor 109 and switch 99 is connected with switch 98 by conductor 110. Switch 98 is also connected with contact 111 of a switch by conductor 112, the other contact 113 of such switch being grounded and carried by a spring arm 114. Relay coil 97 is grounded and connected with conductor 103 by conductor 120. Conductor 121 connects switch 101 with conductor 109 and conductor 122 connects switch 101 with spring arm 124 carrying contact 123 and anchored in the solenoid casing below arm 114. Contact 123 is in line with grounded contact 125 fixed to the end of the pawl rod 62. Spring arm 114 is fixed to but insulated from arm 124 and is movable therewith to engage and break switch contacts 113, 111.

The throttle kick down switch 91 is normally closed, but can be opened by movement of the accelerator pedal 116 beyond wide open throttle position through means of actuator 117. Lock-out switch 92 is closed by a button at the dash and governor switch 93 is open below some predetermined vehicle speed value, such as twenty miles per hour, and is closed above such speed value by suitable mechanism 119 driven by gear 118 fixed to the tail shaft. When the ignition switch 14 and all of the switches 91, 92 and 93 are closed, the pawl solenoid will be energized to engage the pawl with the sun gear and establish overdrive through the planetary gearing, but when any one of such switches are open the solenoid will be deenergized and the pawl will be released by the spring 74 so that the one-way clutch will establish direct drive from shaft 25 to shaft 27.

When the vehicle is moving at a forward speed less than the governed speed, that is twenty miles an hour, the governor controlled switch will be open and the control system will be in the condition shown in Fig. 2. Solenoid 63 will be deenergized and spring 74 will maintain the pawl disengaged from the sun gear so that the drive will be direct from shaft 25 to shaft 27 through the overrunning clutch rollers 43.

Figure 4:
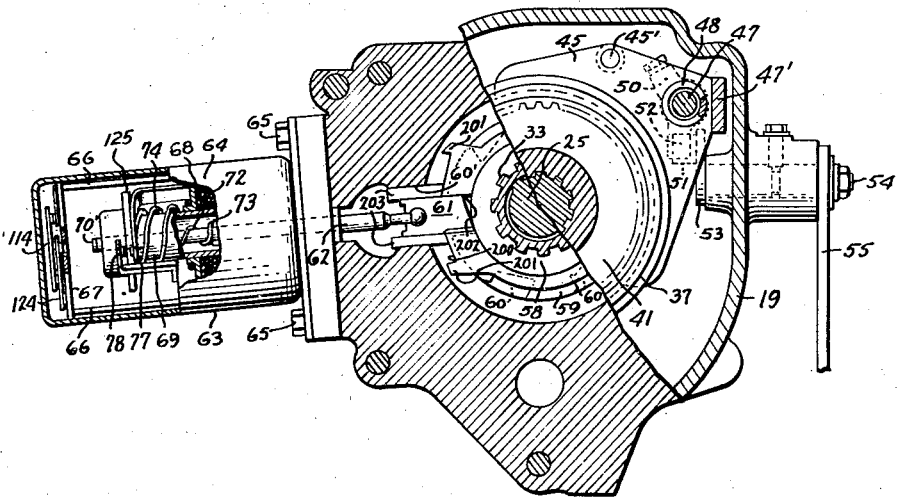
Fig. 4 is a sectional view of the transmission taken approximately on line 4—4 of Fig. 3.

Assuming now that the vehicle speed is increased to above the governed speed, the governor will close switch 93 and, as the lock-out switch 92 and the kick down switch 91 are closed, relay coil 95 will be energized to close relay switch 100 and open relay switch 99. Closing of switch 100 will energize solenoid 96 through conductor 104 and will close switch 98. The circuits through conductors 102 and 103 to the pawl solenoid coils 75 and 76 will be energized causing the armature 69 to move toward the sun gear which will compress spring 72 and will break switch 77, 78 but the pawl movement toward the sun gear is prevented by the blocking ring 200; at the same time coil 75 holds the pawl solenoid armature in the projected position that it has been moved to by coil 76 so that spring 72 remains compressed. Energizing conductor 103 will energize relay coil 97 through conductor 120 and will close switch 101 at approximately the same time switch 100 closes, and as the switch 101 is connected by conductor 121 with conductor 109 connected with the distributor, engine ingnition will be temporarily interrupted by grounding through contacts 123, 125. Such grounding will cause the planetary gearing sun gear to reverse so that the blocker will be shifted therewith and allow compressed spring 72 to push the pawl through slot 200 into one of the recesses 60 in the sun gear sleeve. As soon as the pawl moves past the blocker it carries grounded contact 125 therewith away from contact 123 and thus breaks the ignition grounding circuit so that engine ignition is renewed after a a timed interruption. The pawl now keeps the sun gear from rotating as shown in Fig. 4, so that the drive from shaft 25 to 27 will be accelerated through the planetary gearing.

In the event the driver wishes direct drive above the governed speed, he presses the accelerator pedal beyond wide open throttle position which will open kick-down switch 91. This will deenergize relay solenoids 95 and 96 opening switches 98 and 100, and closing switch 99. The pawl solenoid will be deenergized but torque retains the pawl in the sun gear until reversal of the sun gear drive takes place. Switch 99 is timed to close ahead of the opening of switch 98 so that conductor 109 will be grounded temporarily, due to the grounded contact 113 energizing contact 111 when the pawl engages the sun gear. As soon as switch 98 opens, the ignition grounding circuit is broken so that torque reversal of the sun gear occurs, and engine ignition is resumed. If for any reason switch 98 does not open, then movement of the pawl rod away from the sun gear by spring 74, upon torque reversal, will move grounded contact 113 away from contact 111 to discontinue the engine ignition grounding. This same procedure will follow whenever any one of the switches 91, 92 and 93 is opened, as they are in series. So long as the accelerator pedal is held down beyond wide open throttle position, above the governed speed, the direct drive will continue, but as soon as the pedal is returned to less than wide open throttle position switch 91 will close and overdrive will be restored in the same manner as when the vehicle speed was increased to above the governed speed.

In shifting the pawl into or out of engagement with the sun gear, torque reversal is obtained automatically by momentarily interrupting the engine ignition. Thus it will not be necessary to release the accelerator pedal to decelerate the engine in order to obtain torque reversal as this result will be obtained through the electrical control system.

Under some driving conditions it is desirable to stay in direct drive above the governed speed and in order to accomplish this result, with control mechanism of the type described, it is proposed to provide a control that is responsive to engine operating conditions. Relay coil 97 instead of being connected to conductor 103 as previously described is connected with a switch 160 by conductor 161 and this switch is connected with conductor 103 by conductor 162. The movable element of the switch or contact 163 is contained in housing 164 connected with the engine intake manifold 165 by conduit 166. The arrangement is preferably such that switch 163 is opened when accelerating the engine with low vacuum. Thus the governed switch 93 can be closed above the governed speed but switch 160 will be open so that relay coil 97 will not be energized to close switch 101 until the accelerator pedal is released to increase the vacuum and close switch 160. As a result of non-closing of switch 101, ignition will not be interrupted until desired, as the grounded circuit will be open, and torque will hold the blocker in position to prevent the pawl from engaging the sun gear to establish overdrive. So long as the accelerator pedal is held down to accelerate the motor under a low vacuum condition above the governed speed, the shift from direct to overdrive will not occur until either the acceleration of the engine drops off or the accelerator pedal is released under which two conditions the shift will be made in the usual manner. Thus the accelerator pedal delays ignition interruption as desired in shifting from direct to overdrive. The vacuum control mechanism can be similar to that described and shown in the application previously referred to.

It will be understood that this invention is not limited to use between a plural speed drive shaft and a tail shaft, but is capable of use between any engine operated shaft and a shaft driven thereby.

Although the invention has been described in connection with a specific embodiment, the principles involved are susceptible of numerous other applications which will readily occur to persons skilled in the art.

What I claim is:

1. In apparatus for controlling an internal combustion engine driven overdrive mechanism have planetary gearing including a sun gear, the combination comprising a sun gear locking pawl means, a spring normally holding the pawl means released from sun gear locking position, means for moving the pawl means into sun gear locking position against the action of said spring, torque controlled means movable to block movement of said pawl means into locking position with the sun gear, and automatically effective means for interrupting engine operation for an interval sufficient to obtain reversal of the torque effect on said blocking means when movement of the pawl means into locking position is initiated.

2. In apparatus for controlling an engine ignition system and engine driven overdrive mechanism having planetary gearing including a sun gear, a pawl shiftable to hold or release the sun gear, a spring normally holding the pawl released from the sun gear, means for moving the pawl into sun gear holding position against the action of said spring, torque controlled means blocking shifting of said pawl into sun gear holding position, means operable to energize or deenergize said solenoid, and automatic means operable to momentarily ground the ignition system whenever the solenoid is energized after being deenergized, the grounding of the ignition system reversing torque on said blocking means to cause reversal thereof unblocking movement of the pawl to engage the sun gear.

3. In apparatus for controlling planetary overdrive mechanism of an automobile propelled by an internal combustion engine having electrical ignition apparatus, the combination with the sun gear of the overdrive mechanism, of a sun gear locking pawl, a spring normally holding the pawl in sun gear releasing position, means for moving the pawl into locking position against the action of said spring, a current source for operating the ignition apparatus, movable means frictionally engaged by the sun gear for blocking the pawl from engagement with the sun gear, and means operating automatically to render the pawl moving means operative and for disconnecting the ignition apparatus from the current source for a short interval so as to render the engine inoperative to apply torque to the overdrive mechanism to permit the blocking means to shift with the sun gear in its reversal of rotation and allow the pawl to move into sun gear locking position.

4. In a vehicle drive having a planetary gearing overdrive mechanism driven by an engine having electrical ignition apparatus, control apparatus comprising a pawl shiftable to brake or release the planetary gearing sun gear, a spring normally holding the pawl released from the sun gear, a solenoid for moving the pawl into braking relation with the sun gear against the action of the spring, a current source for operating the ignition apparatus and the solenoid, a blocker controlled by torque to prevent the shifting of the pawl into sun gear locking position, and means operative to automatically connect and disconnect the current source from the solenoid including relay means, said relay means being connected to interrupt the connection of the current source with the ignition apparatus for a short interval whenever the flow of current to the solenoid is resumed.

5. In apparatus for controlling an ignition engine driven overdrive having planetary gearing including a sun gear, the combination comprising a shiftable sun gear locking pawl, a spring normally holding the pawl released from the pawl, a solenoid for moving the pawl into locking engagement with the sun gear against the action of the spring, torque controlled means for blocking the pawl from engagement with the sun gear, control means operative to render the solenoid operative or inoperative, and means acting automatically to interrupt engine ignition for an interval sufficient to cause torque reversal whenever said pawl is to be shifted.

6. In apparatus for controlling an engine ignition system and overdrive mechanism driven by the engine having planetary gearing including a sun gear, means shiftable to hold or release the sun gear, a spring normally holding said means released from the sun gear, a solenoid for moving said means into sun gear holding position, torque controlled means for blocking the shifting of said means into sun gear holding position, control means operative to energize or deenergize the solenoid, and means automatically operative to momentarily ground the ignition system whenever the solenoid control means is operated to energize or deenergize the solenoid.

7. In apparatus for controlling an ignition engine driven overdrive mechanism having planetary gearing including a sun gear, the combination comprising a sun gear locking pawl, a spring normally holding the pawl released from the sun gear, means for moving said pawl into locking engagement with the sun gear, torque controlled means for blocking engagement of the pawl with the sun gear, automatic means effective when the pawl moving means is made effective to interrupt engine ignition for an interval sufficient to obtain torque reversal necessary to shift the blocking means and thereby permit sun gear engagement by the pawl, and means for rendering the pawl moving means inoperative and for momentarily interrupting the engine ignition to reduce the torque sufficiently to allow the spring to release the pawl from the sun gear.

8. Drive mechanism having an internal combustion engine with electric ignition, and overdrive planetary gearing including a sun gear, means operable to brake and release said sun gear, means retarding operation of said means to brake said sun gear, means for interrupting engine ignition to render said brake means effective, and means responsive to engine vacuum conditions controlling said interrupting means.

9. Drive mechanism having an internal combustion engine with electric ignition, and overdrive planetary gearing including a sun gear, means operable to brake and release said sun gear, means retarding operation of said sun gear brake means, automatic means for momentarily grounding said engine ignition to render said brake means effective below a predetermined speed, and means rendering said grounding means effective only when the engine is decelerating.

10. Drive mechanism having an internal combustion engine with electric ignition, and overdrive planetary gearing including a sun gear, a pawl operable to hold said sun gear, means for releasing said pawl, means for engaging said pawl with the sun gear, means including a relay controlling said pawl engaging means, torque controlled means for blocking engagement of the pawl with the sun gear, automatic means for interrupting engine ignition responsive to the conditioning of the relay to engage the pawl, and vacuum means controlling said ignition interrupting means.

11. In change speed mechanism having a planetary gear including a sun gear driven by an engine having electrically controlled ignition, control means shiftable into either holding or releasing relations with the sun gear, means normally acting to shift the control means into one of said relations with the sun gear, automatic means effective to shift the control means into the other of said relations with the sun gear, and means effective to automatically interrupt engine ignition for an interval sufficient to obtain torque reversal preparatory to changing either relation of the control means with the sun gear.

12. In apparatus for controlling an electric ignition engine driven overdrive mechanism having planetary gearing including a sun gear, the combination comprising a sun gear locking pawl, a spring normally holding the pawl released from the sun gear, a solenoid for moving the pawl toward locking position against the action of said spring, torque controlled means blocking the pawl from locking the sun gear, and speed responsive means effective to render the solenoid operative to shift the pawl toward said sun gear and to render the engine ignition inoperative for an interval sufficient to reverse the torque effect upon the blocking means.

LESTER L. BELTZ.